(12) United States Patent
Baudassé et al.

(10) Patent No.: US 11,597,538 B2
(45) Date of Patent: Mar. 7, 2023

(54) TAPE-SPRING DEPLOYABLE DEVICE WITH A NON-CONSTANT CROSS SECTION

(71) Applicant: THALES, Courbevoie (FR)

(72) Inventors: Yannick Baudassé, Cannes la Bocca (FR); François Guinot, Cannes la Bocca (FR); Stéphane Vézain, Cannes la Bocca (FR)

(73) Assignee: THALES, Courbevoie (FR)

( * ) Notice: Subject to any disclaimer, the term of this patent is extended or adjusted under 35 U.S.C. 154(b) by 467 days.

(21) Appl. No.: 16/655,139

(22) Filed: Oct. 16, 2019

(65) Prior Publication Data
US 2020/0122862 A1 Apr. 23, 2020

(30) Foreign Application Priority Data

Oct. 18, 2018 (FR) ...................................... 1801096

(51) Int. Cl.
*B64G 1/22* (2006.01)
*B64G 1/66* (2006.01)

(52) U.S. Cl.
CPC .............. *B64G 1/222* (2013.01); *B64G 1/66* (2013.01)

(58) Field of Classification Search
CPC .................................. B64G 1/222; B64G 1/66
See application file for complete search history.

(56) References Cited

U.S. PATENT DOCUMENTS

| | | | | |
|---|---|---|---|---|
| 3,528,543 A | * | 9/1970 | Robinsky | B65D 81/03 |
| | | | | 428/178 |
| 4,991,784 A | * | 2/1991 | Schmid | B65G 47/82 |
| | | | | 242/585 |
| 9,605,430 B2 | * | 3/2017 | Baudasse | E04C 3/005 |
| 9,796,485 B2 | * | 10/2017 | Baudassé | B65H 75/364 |
| 2016/0144984 A1 | * | 5/2016 | Baudassé | B64G 1/222 |
| | | | | 244/172.6 |
| 2017/0058524 A1 | * | 3/2017 | Fernandez | E04C 3/005 |
| 2018/0111703 A1 | | 4/2018 | Hensley et al. | |

FOREIGN PATENT DOCUMENTS

| | | |
|---|---|---|
| CN | 106 864 772 A | 6/2017 |
| EP | 0 319 921 A2 | 6/1989 |
| EP | 2 993 131 A1 | 3/2016 |
| WO | 2015/153824 A1 | 10/2015 |

\* cited by examiner

*Primary Examiner* — Assres H Woldemaryam
(74) *Attorney, Agent, or Firm* — BakerHostetler

(57) ABSTRACT

A deployable device includes a tape-spring capable of passing from a wound configuration about a first axis Z to a deployed configuration along a second axis X substantially perpendicular to the first axis Z, the tape-spring having two characteristic dimensions, a first characteristic dimension being the width of the tape-spring along the first axis Z, a second characteristic dimension being the thickness of the tape-spring along a third axis Y substantially perpendicular to the first axis Z and to the second axis X. At least one of the two characteristic dimensions has a non-constant value along the second axis X.

5 Claims, 4 Drawing Sheets

TAPE-SPRING DEPLOYABLE DEVICE WITH A NON-CONSTANT CROSS SECTION

CROSS-REFERENCE TO RELATED APPLICATIONS

This application claims priority to foreign French patent application No. FR 1801096, filed on Oct. 18, 2018, the disclosure of which is incorporated by reference in its entirety.

FIELD OF THE INVENTION

The present invention relates to a tape-spring deployable device with a non-constant cross section. It applies notably to the field of space equipment to be deployed in orbit and, more particularly, to space equipment for satellites, such antennas, solar generators or instruments. However, the invention applies to any other field in which it is desirable to distance an object from a carrying structure.

BACKGROUND

In the space field, tape-springs are frequently used in deployment. In the stowed (or wound) position, tape-springs are wound about a mandrel. Tape-springs deploy autonomously by spontaneously unwinding when the mandrel is free to rotate. Tape-springs are known in the space field as being flexible strips that have a circular-arc cross section, the radius of curvature of which is convex on a first face and concave on a second face, these strips being capable of passing from the wound state to the unwound state essentially by virtue of their intrinsic elastic energy. There are various types of strip that have intrinsic properties. Monostable strips have a natural deployed position and require holding in the stowed position. Monostable tape-springs thus have a natural tendency to deploy themselves such as to lie in their unwound state. Deployment of monostable strips is often chaotic and uncontrolled. Bistable strips have two natural positions (wound position and deployed position) and do not require holding in the wound position when the cross section is totally flattened. Their deployment is linear and controlled.

When it is desired to distance the object from the carrying structure, for example in order to position an object, the tape-springs have to ensure holding of the object in the wound configuration and the rigidity of the assembly during deployment. In point of fact, tape-springs do not have the same stiffness along the stress axis. A force F applied to the convex face of the tape-spring will have a tendency to cause the tape-spring to flex, whereas the same force applied to the concave face will have no effect, which poses a problem of instability of the flexible structure in its deployed state. To solve this problem of stability in the deployed state it is thus necessary to oversize the tape-spring such that it remains stable under orbital forces, irrespective of the direction of application thereof.

Thus, in the stowed configuration, the tape-spring must be as compact as possible, that is to say it must have a winding radius that is as small as possible. This parameter is given by the physical characteristics of the strip, and generally the winding radius is substantially equal to that of their radius of curvature. In the deployed configuration, optimum rigidity is sought, which means a cross section that is as large as possible and as closed as possible, associated with embedding of the end of the tape-spring that is as great as possible. These solutions are not optimised in terms of mass.

SUMMARY OF THE INVENTION

The invention aims to palliate all or some of the problems cited above by proposing a deployable device comprising a tape-spring that can be wound and deployed, offering the advantage of being compact, and easy to produce, and offering optimisation of the mass of the deployable device and allowing rigidity and stability of the tape-spring when it is deployed.

To that end, a subject of the invention is a deployable device comprising a tape-spring capable of passing from a wound configuration about a first axis Z to a deployed configuration along a second axis X substantially perpendicular to the first axis Z, the tape-spring having two characteristic dimensions, a first characteristic dimension being the width of the tape-spring along the first axis Z, a second characteristic dimension being the thickness of the tape-spring along a third axis Y substantially perpendicular to the first axis Z and to the second axis X, at least one of the two characteristic dimensions having a non-constant value along the second axis X.

According to one embodiment, the tape-spring has a free end, and the at least one of the two characteristic dimensions has a non-constant value along the second axis X, decreasing towards the free end.

According to another embodiment, the tape-spring has an embedded end, and the at least one of the two characteristic dimensions has a non-constant value along the second axis X, increasing and decreasing over a first portion of the tape-spring and increasing over a second portion of the tape-spring towards the embedded end.

Advantageously, the deployable device according to the invention comprises at least one local reinforcement positioned on the tape-spring, extending at least partially along the first axis Z and/or extending at least partially along the second axis X, in a preferential manner.

According to variants of the deployable device according to the invention, a cross section of the tape-spring may be a cross section of cylindrical form, of U-shaped form or of "omega" form.

The invention also relates to a satellite comprising at least one deployable device as described above.

BRIEF DESCRIPTION OF THE DRAWINGS

The invention will be better understood and further advantages will become apparent upon reading the detailed description of an embodiment given by way of example, the description being illustrated by the attached drawing, in which.

For reasons of clarity, the same elements will bear the same references in the various figures.

DETAILED DESCRIPTION

The invention applies to monostable or bistable tape-springs. The employment of monostable tape-springs requires a greater guiding force. Bistable tape-springs are preferred for the uniform nature of their deployment. Furthermore, in the wound configuration, they remain wound, and in the deployed configuration, they remain deployed.

Figure 1:
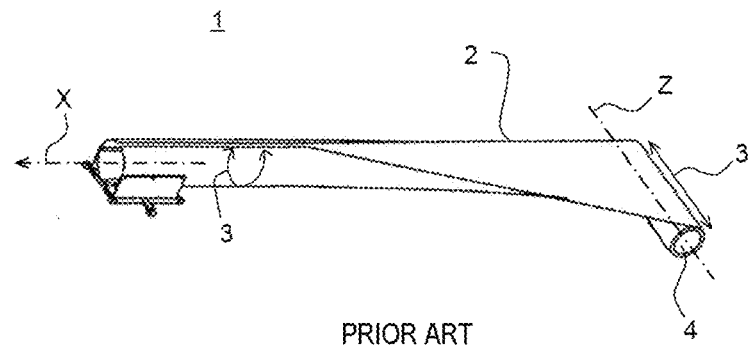
FIG. 1 shows a tape-spring deployable device according to the prior art.

FIG. 1 shows a tape-spring deployable device 1 according to the prior art. The deployable device 1 comprises a tape-spring 2 capable of passing from a wound configuration about a first axis Z to a deployed configuration along a second axis X substantially parallel to the first axis Z. The width 3 of the tape-spring is identical along the entire axis X and equal to the width 3 of the tape-spring at the point of winding about the mandrel 4. This corresponds to the usual deployed configuration of the prior art, and optimum rigidity is obtained by means of a cross section that is as large, as thick, and as closed as possible, optionally associated with embedding of the end of the tape-spring.

Figure 2:
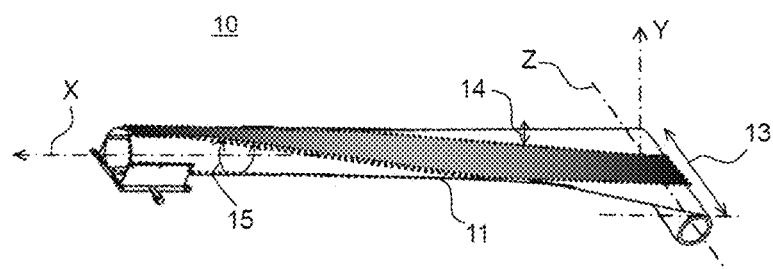
FIG. 2 shows a first embodiment of a deployable device according to the invention.

FIG. 2 shows a first embodiment of a deployable device 10 according to the invention. The deployable device 10 comprises a tape-spring 11 capable of passing from a wound configuration about a first axis Z to a deployed configuration along a second axis X substantially perpendicular to the first axis Z. The tape-spring 11 has two characteristic dimensions, a first characteristic dimension 13 being the width of the tape-spring 11 along the first axis Z, and a second characteristic dimension 14 being the thickness of the tape-spring 11 along a third axis Y substantially perpendicular to the first axis Z and to the second axis X. According to the invention, at least one of the two characteristic dimensions 13, 14 has a non-constant value along the second axis X. In other words, the width of the tape-spring 11 and/or the thickness of the tape-spring 11 evolves along the second axis X. It may be seen notably in FIG. 2 that the width 13 of the tape-spring towards its free end is less than the width 13 of the tape-spring at the mandrel (the grey-shaded representation of the surface makes it possible visually to compare the widths). This solution allows a considerable saving in terms of mass, of the order of 30%, as compared with a solution in which there is a constant tape-spring cross section, whilst still guaranteeing satisfactory rigidity for the tape-spring. For the purposes of sizing this type of structure, it is sought to optimise the mass/stiffness ratio by attempting to obtain a rate of stress in the material that is as uniform as possible. This type of result may be obtained by virtue of topological optimisation methods that make it possible to identify optimal material distribution in a given volume subject to stresses.

Figure 3:
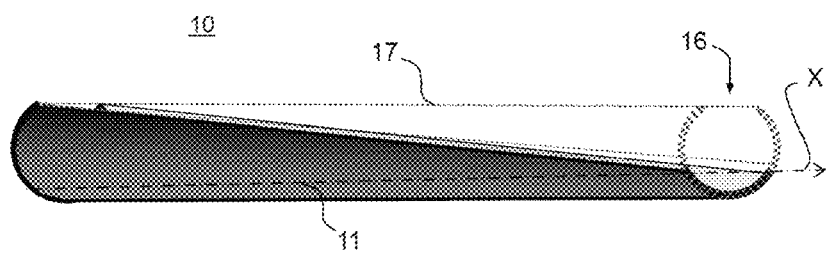
FIG. 3 shows another view of the first embodiment of the deployable device according to the invention.

FIG. 3 shows another view of the first embodiment of the deployable device 10 according to the invention, and more precisely a view of the tape-spring 11 deployed along the second axis X. As explained previously, the tape-spring 11 has a free end 16 and the at least one of the two characteristic dimensions (in this case, the width) has a non-constant value along the second axis X. In the example presented, the width decreases towards the free end. It will be seen that for a constant width of a tape-spring the tape-spring 11 would extend as far as the dotted line 17. This results in a saving in terms of mass.

By virtue of this optimisation of the cross section, it is thus possible to implement a smaller-capacity drive device that is lighter in weight and more compact since the cross section is smaller over a long length, implying a lower requirement in terms of winding torque.

Based on the same principle, the thickness 14 of the tape-spring 11 along the third axis Y may also evolve along the second axis X. Preferably, the thickness 14 of the tape-spring 11 is greater at the base of the tape-spring 11, that is to say close to the mandrel, and thinner towards the free end. For example, for a tape-spring 100 mm in diameter, the thickness may be 0.6 mm over 2 or 3 meters of the tape-spring and then evolve to 0.4 mm, ending at 0.3 mm at the end of the tape-spring. The evolving thickness allows a significant gain in terms of mass. The rigidity of the tape-spring is, however, maintained.

It may be noted that the width and/or the thickness increase and/or decrease linearly or non-linearly. Evolving profiles are determined in advance. The cross sections of the foot and of the head of the tape-spring are defined by calculations pertaining to the mechanical strength of the tape-spring, notably using optimisation methods as mentioned previously.

As the tape-spring is made from carbon, glass or other fibres, for the thickness of the tape-spring to evolve fibres are added or removed depending on the required thickness.

In order to obtain an evolving width, the tape-spring is generally machined using numerical control as a function of the stressed or non-stressed zones.

Figure 4:
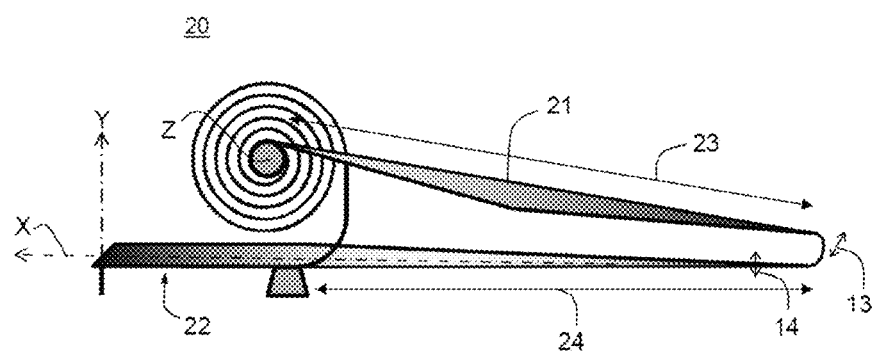
FIG. 4 shows a second embodiment of an embedded tape-spring deployable device according to the invention.

FIG. 4 shows a second embodiment of an embedded tape-spring deployable device 20 according to the invention. The tape-spring 21 has an embedded end 22. The at least one of the two characteristic dimensions (width 13, thickness 14) has a non-constant value along the second axis X, increasing and decreasing over a first portion 23 of the tape-spring 21 and increasing over a second portion 24 of the tape-spring 21 towards the embedded end 22. It may be noted that the axis X is to be understood as the axis along which the tape-spring extends locally in the deployed configuration and which extends locally in a direction substantially perpendicular to the winding axis Z of the tape-spring.

Figure 5:
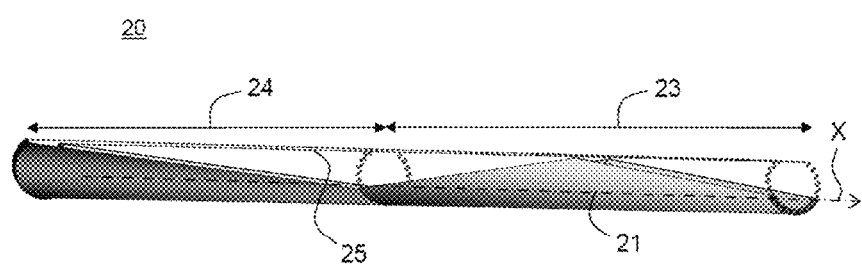
FIG. 5 shows another view of the second embodiment of the deployable device according to the invention.

FIG. 5 shows another view of the second embodiment of the deployable device 20 according to the invention, and more precisely a view of the tape-spring 21 deployed along the second axis X. This representation shows the evolving profile of the cross section, in terms of width, of the tape-spring 21. In comparison with the dotted line 25, along which a prior-art tape-spring would extend, the saving in terms of mass is clearly visible.

This results in an optimisation in terms of mass and rigidity of the deployable device. This optimisation may make it possible, frequently in terms of equivalent deployed configuration relative to a prior-art device, to reduce the thickness of the tape-spring and thus to reduce the energy needed to wind the tape-spring.

Figure 6:
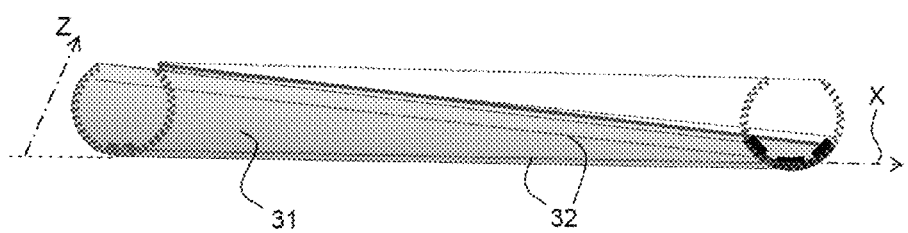
FIG. 6 shows another embodiment of a tape-spring of a deployable device according to the invention.

FIG. 6 shows another embodiment of a tape-spring 31 of a deployable device according to the invention. In this embodiment, the deployable device comprises at least one local reinforcement 32 positioned on the tape-spring 31, extending at least partially along the second axis X. Preferably, the local reinforcement 32 is positioned along the entire length of the tape-spring 31, at the edges thereof and/or at the centre of the tape-spring 31. The reinforcement 32 makes it possible locally to reinforce the tape-spring 31 and thereby to guarantee the required rigidity for the tape-spring 31.

Figure 7:
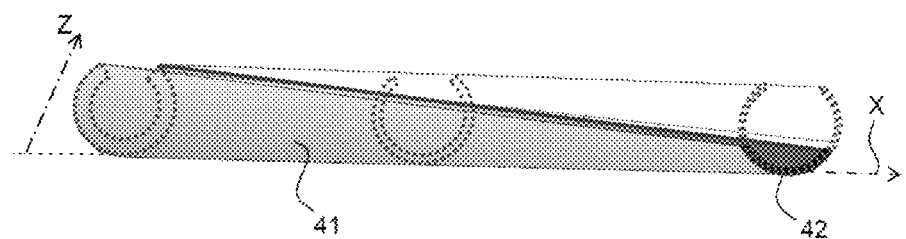
FIG. 7 shows another embodiment of a tape-spring of a deployable device according to the invention.

FIG. 7 shows another embodiment of a tape-spring 41 of a deployable device according to the invention. In this embodiment, the deployable device comprises at least one local reinforcement 42 positioned on the tape-spring 41, extending at least partially along the first axis Z. Preferably, the local reinforcement 42 is positioned at the free end of the tape-spring 41, but may be positioned at other locations on the tape-spring 41.

The local reinforcements 32, 42 are generally bands of carbon. They may be in the form of unidirectional fibre or fabric (in the case of longitudinal reinforcements) or fibres woven over a principle cross section or, alternatively, crossing fibres. The fibres are adjusted as a function of the stresses in the tape-spring.

The positioning and the form thereof are connected with the geometry of the tape-spring. They are placed where the stresses are located, the field of stresses being determined beforehand using modelling tools of the tape-spring. Thus, it can be ensured that the cut-out profile does not have an impact on the integrity of the tape-spring, and the rigidity of the tape-spring is guaranteed by the presence, if required, of local reinforcements.

Figure 8:
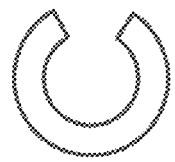
FIGS. 8, 9 and 10 show variant cross sections of a tape-spring of a deployable device according to the invention, FIG. 11 schematically shows a satellite comprising at least one deployable device according to the invention.
Figure 9:
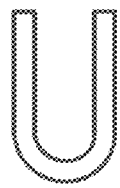
Figure 10:

FIGS. 8, 9 and 10 show variant cross sections of a tape-spring of a deployable device according to the invention. FIG. 8 shows a "cylindrical" cross section, like that which has been presented in the preceding figures.

However, the cross section of the tape-spring may be of U-shaped form, as shown in FIG. 9. In the case of a deployable device implementing two tape-springs in one and the same plane, rigidity in this plane is obtained by the presence of two tape-springs. A U-shaped cross section of tape-springs makes it possible to confer enhanced rigidity in the other plane.

Alternatively, it is also possible to consider an "omega" cross section, as shown in FIG. 10. This cross section also makes it possible to limit friction thereon at the entry to the roller.

Figure 11:
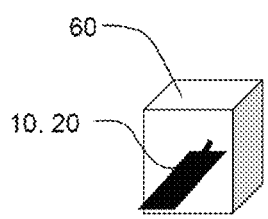

FIG. 11 schematically shows a satellite 60 comprising at least one deployable device according to the invention.

The invention claimed is:

1. A deployable device of space equipment, the deployable device comprising:
a tape-spring capable of passing from a wound configuration about a first axis Z to a deployed configuration along a second axis X substantially perpendicular to the first axis Z, the tape-spring having two characteristic dimensions, a first characteristic dimension being the width of the tape-spring along the first axis Z, a second characteristic dimension being the thickness of the tape-spring along a third axis Y substantially perpendicular to the first axis Z and to the second axis X,
wherein at least one of the two characteristic dimensions having a non-constant value along the second axis X,
wherein the tape-spring has an embedded end opposite an end of the tape-spring that the tape-spring is wound about the first axis Z in the wound configuration,
wherein the first characteristic dimension increases and decreases towards the embedded end over a first portion of the tape-spring and increases towards the embedded end over a second portion of the tape-spring that extends continuously from the first portion to the embedded end,
wherein the second characteristic dimension decreases towards the embedded end,
wherein the first portion of the tape-spring is between the end of the tape-spring opposite the embedded end and a minimum width of the tape spring, and
wherein the second portion of the tape-spring is between the minimum width of the tape-spring and the embedded end of the tape-spring.

2. The deployable device according to claim 1, wherein the tape-spring has a free portion, and wherein the at least one of the two characteristic dimensions decreases towards the free portion.

3. The deployable device according to claim 1, comprising at least one local reinforcement positioned on the tape-spring, extending at least partially along at least one of the first axis Z or the second axis X.

4. The deployable device according to claim 1, wherein a cross section of the tape-spring is a cross section of cylindrical form, of U-shaped form, or of omega form.

5. A satellite comprising the deployable device according to claim 1.

* * * * *